United States Patent [19]

Higuchi et al.

[11] Patent Number: 5,124,425

[45] Date of Patent: Jun. 23, 1992

[54] CURABLE POLYURETHANE COMPOSITION EXCELLENT IN FLEXIBILITY

[75] Inventors: Toshihiko Higuchi; Shigeyuki Kozawa; Nobuaki Kunji, all of Yokohama, Japan

[73] Assignee: Asahi Glass Company Ltd., Tokyo, Japan

[21] Appl. No.: 635,588

[22] PCT Filed: May 2, 1990

[86] PCT No.: PCT/JP90/00578

§ 371 Date: Jan. 9, 1991

§ 102(e) Date: Jan. 9, 1991

[87] PCT Pub. No.: WO90/13586

PCT Pub. Date: Nov. 15, 1990

[30] Foreign Application Priority Data

May 9, 1989 [JP] Japan .................................. 1-114059

[51] Int. Cl.$^5$ ............................................. C08G 18/12
[52] U.S. Cl. ......................................................... 528/59
[58] Field of Search ............................................ 528/59

[56] References Cited

U.S. PATENT DOCUMENTS 4,721,818 1/1988 Harper et al. .......................... 270/54

FOREIGN PATENT DOCUMENTS 52-20441 6/1977
47-613 1/1972 Japan .
57-65718 4/1982 Japan .
57-76028 5/1982 Japan .

*Primary Examiner*—Maurice J. Welsh
*Attorney, Agent, or Firm*—Oblon, Spivak, McClelland, Maier & Neustadt

[57] ABSTRACT

The present invention is a room temperature curable polyurethane composition comprising as a curable component a polyurethane prepolymer having terminal isocyanate groups obtained by reacting an organic polyisocyanate and a polyol comprising as the main component a polyoxyalkylenepolyol having a molecular weight per hydroxyl group of from 1,500 to 15,000 and a total unsaturation degree of at most 0.07 meq/g.

The above polyoxyalkylenepolyol having a molecular weight per hydroxyl group of from 1,500 to 15,000 and a total unsaturation degree of at most 0.07 meq/g, is produced by ring-opening addition polymerizing an alkylene oxide to an initiator, preferably by means of a double metal cyanide complex catalyst.

By curing this curable polyurethane composition by moisture in air, a highly flexible cured product will be obtained. Further, by curing this curable polyurethane composition wherein a high molecular weight polyoxyalkylenepolyol is used as a curing agent, a highly flexible similar cured product is obtainable.

This curable polyurethane composition is useful as sealing materials or water-proof materials.

10 Claims, No Drawings

CURABLE POLYURETHANE COMPOSITION EXCELLENT IN FLEXIBILITY

TECHNICAL FIELD

The present invention relates to a curable composition which is curable at room temperature to present a cured product having a low modulus and high elongation and which is useful as sealing material or waterproof material.

BACKGROUND ART

A polyurethane prepolymer having terminal isocyanate groups is used for a one-pack type composition curable by reaction with moisture in the air and for a two-pack type composition curable by being mixed with an active hydrogen compound. Such a one-pack type or two-pack curable composition is widely used in the field of building materials or construction materials, such as sealing materials, waterproof materials or floor materials. Reflecting diversification of building and construction fashions in recent years, sealing materials and waterproof materials having higher flexibility and elongation are desired.

In order to obtain a cured product having flexibility and high elongation by a curable polyurethane composition, it is common to employ a method of using a polyoxyalkylenepolyol having a high molecular weight, or a method wherein the content of a bifunctional polyoxyalkylenepolyol is increased so that the average number of functional groups of the polyoxyalkylenepolyol component is decreased. However, such methods have drawbacks that the curing speed tends to be slow, and the tackiness of the cured products tends to increase, and they failed to provide satisfactory properties.

DISCLOSURE OF INVENTION

The present inventors have conducted extensive researches to solve the above mentioned problems and as a result, have found it possible to obtain a cured product having flexibility and high elongation without lowering the curing speed or without increasing the tackiness, by using as a polyoxyalkylenepolyol component a polyoxyalkylenepolyol having a molecular weight per hydroxyl group within a range of from 1,500 to 15,000 and a total unsaturation degree of at most 0.07. Namely, the present invention presents the following curable composition useful as sealing material or waterproof material:

A room temperature curable polyurethane composition comprising as a curable component a polyurethane prepolymer having terminal isocyanate groups obtained by reacting an organic polyisocyanate and a polyol comprising as the main component a polyoxyalkylenepolyol having a molecular weight per hydroxyl group of from 1,500 to 15,000 and a total unsaturation degree of at most 0.07 meq/g.

The polyoxyalkylenepolyol having a molecular weight per hydroxyl group within a range of from 1,500 to 15,000 and a total unsaturation degree of at most 0.07 to be used in the present invention, can be prepared usually by means of a catalyst such as zinc diethyl, iron chloride, a metal porphyrin or a double metal cyanide complex. It is not advisable to use a usual alkali catalyst such as KOH, since the unsaturation degree tends to be high, particularly with a high molecular weight product. It is preferred to employ a double metal cyanide complex catalyst.

It is known to use a double metal cyanide complex such as cobalt zinc cyanide-grime as a catalyst for producing a polyoxyalkylenepolyol. Such a double metal cyanide complex catalyst is disclosed in e.g. EP283148 and in the following U.S. Patents:

U.S. Pat. No. 3278457, U.S. Pat. No. 3278458, U.S. Pat. No. 3278459

U.S. Pat. No. 3427256, U.S. Pat. No. 3427334, U.S. Pat. No. 3427335

U.S. Pat. No. 3829505, U.S. Pat. No. 3941849, U.S. Pat. No. 4355188

U.S. Pat. No. 4472560, U.S. Pat. No. 4721818

For the production of the polyoxyalkylenepolyol having a high molecular weight and a low unsaturated degree in the present invention, it is preferred to employ a double metal cyanide complex catalyst as disclosed in the above references. Such a catalyst is believed to have a structure of the following formula (1).

$$M_a [M'_x(CN)_y]_b(H_2O)_c(R)_d \qquad (1)$$

wherein M is Zn(II), Fe(II), Fe(III), Co(II), Ni(II), Al(III), Sr(II), Mn(II), Cr(III), Cu(II), Sn(II), Pb(II), Mo(IV), Mo(VI), W(IV) or W(VI), M' is Fe(II), Fe(III), Co(II), Co(III), Cr(II), Cr(III), Mn(II), Mn(III), Ni(II), V(IV) or V(V), R is an organic ligand, and each of a, b, x and y is a positive integer variable depending upon the valence and the coordination number of metals, and each of c and d is a positive integer variable depending upon the coordination number of metals.

In the formula (1), M is preferably Zn(II), and M' is preferably Fe(II), Fe(III), Co(II) or Co(III). The organic ligand may, for example, be a ketone, an ether, an aldehyde, an ester, an alcohol or an amide.

The polyoxyalkylenepolyol can be produced by reacting a monoepoxide to a polyfunctional initiator in the presence of a catalyst as described above. The monoepoxide is a compound having one epoxy ring, such as an alkylene oxide, a glycidyl ether or a glycidyl ester. Preferred monoepoxides include ethylene oxide, propylene oxide, 1,2-butylene oxide, 2,3-butylene oxide, styrene and other alkylene oxides. Particularly preferred is propylene oxide or butylene oxide. A particularly preferred polyoxyalkylenepolyol is a polyoxypropylenepolyol having a propylene oxide residue (i.e. oxypropylene group) content of at least 70% by weight obtained by using propylene oxide as the main material.

The initiator includes a polyhydroxy compound, an amine compound, a polyhydroxy compound and a polyoxyalkylenepolyol having a molecular weight lower than the desired product, which is obtainable by reacting such a compound with a relatively small amount of monoepoxide. Preferably, it includes a polyhydric alcohol, a polyhydric phenol and a polyoxyalkylenepolyol having a molecular weight lower than the desired product, which is obtainable by reacting such an alcohol or phenol with a relatively small amount of an alkylene oxide. Specifically, it includes ethylene glycol, dipropylene glycol, butanediol, glycerol, trimethylolpropane, pentaerythritol, dextrose, bisphenol A, bisphenol S and a polyoxypropylenepolyol obtainable by reacting such a compound with propylene oxide. These initiators may be used in combination as a mixture of two or more different types.

The molecular weight per hydroxyl group of the polyoxyalkylenepolyol is required to be from 1,500 to 15,000, preferably from 2,000 to 15,000. It is usually possible to obtain a cured product having higher flexibility and larger elongation as the molecular weight is higher. However, even when the molecular weight is relatively low (for example, at a level of from 1,500 to 2,000), it is possible to obtain a cured product having high flexibility and large elongation by using a high molecular weight polyol curing agent as will be described hereinafter. Further, the number of hydroxyl groups of the polyoxyalkylenepolyol is preferably more than 2 on average, particularly at least 2.5, most preferably at least about 3. The upper limit is usually 8, preferably 6. If the number of hydroxyl groups of the polyoxyalkylenepolyol is 2, there will be no crosslinking portion, when no curing agent is used, the strength of the cured product tends to be inadequate particularly when the polyoxyalkyolenepolyol is of a high molecular weight.

The total unsaturated degree of the polyoxyalkylenepolyol is required to be at most 0.07 meq/g, preferably at most 0.04 meq/g. When the molecular weight of the polyoxyalkylenepolyol is relatively low (for example, in a case where the molecular weight per hydroxyl group is from 1,500 to 2,000), the total unsaturation degree is preferably at most 0.03 meq/g.) When the total unsaturation degree is high, tackiness tends to be high, or the curing speed tends to be low. This is believed to be attributable to the fact that the amount of an unsaturated monool contained in the polyoxyalkylenepolyol is large, so that the number of substantial functional groups decreases and at the same time, the unsaturated monool functions as a plasticizer, which will be disadvantageous to prevent the decrease of the curing speed or the increase of tackiness.

The isocyanate group-containing polyurethane prepolymer can be obtained by reacting a polyoxyalkylenepolyol with various organic polyisocyanate compounds under a condition such that the polyisocyanate compound is in an excess amount. As the polyoxyalkylenepolyol, the above mentioned polyoxyalkylenepolyol is mainly used, but other polyoxyalkylenepolyols may be incorporated, as the case requires. Particularly preferred is an isocyanate group-containing polyurethane prepolymer obtained by reacting from 0.6 n to n mol of a poly-isocyanate compound to 1 mol of a polyoxyalkylenepolyol having n hydroxyl groups. The polyisocyanate compound may be used in an excess amount so that a non-reacted material will remain. In a case where the amount of such non-reacted material is too much, it is possible to remove the non-reacted polyisocyanate compound after the completion of the reaction. The isocyanate group content of the isocyanate group-containing polyurethane prepolymer thus obtained, is preferably from 0.1 to 5% by weight.

The polyisocyanate compound may be an aromatic, alicyclic or aliphatic polyisocyanate having at least two isocyanate groups, a mixture of at least two such polyisocyanates, or a modified polyisocyanate obtained by modifying such a polyisocyanate. Specifically, it includes polyisocyanates such as tolylene diisocyanate, diphenylmethane diisocyanate, polymethylene polyphenyl isocyanate (so-called crude MDI), xylylene diisocyanate, isophorone diisocyanate and hexamethylene diisocyanate, and prepolymer-modified products, nulete-modified products, urea-modified products and carbodiimide-modified products thereof.

Curable polyurethane compositions of the present invention may be classified into a moisture curable one-pack type curable composition wherein the above mentioned polyurethane prepolymer is used alone as a curable component and a two-pack type curable composition wherein e.g. a polyoxyalkylenepolyol is used as a curing agent. The polyoxyalkylenepolyol as the curing agent (the second polyoxyalkylenepolyol) is preferably the above mentioned polyoxyalkylenepolyol having a high molecular weight and a low unsaturation degree. When the above mentioned polyoxyalkylenepolyol having a high molecular weight and a low unsaturation degree is more than bifunctional, the polyoxyalkylenepolyol as the curing agent may be bifunctional. When the above mentioned polyoxyalkylenepolyol having a high molecular weight and a low unsaturated degree is bifunctional, the polyoxyalkylenepolyol as the curing agent is preferably more than bifunctional. In the total polyoxyalkylenepolyol used for a one-pack type curable composition or a two-pack type curable composition, the proportion of the above mentioned polyoxyalkylenepolyol having a high molecular weight and a low unsaturation degree is required to be at least 10% by weight, preferably from 30 to 100% by weight. Other polyoxyalkylenepolyols may be of a low molecular weight and may have a usual unsaturation degree. Preferred other polyoxyalkylenepolyols are polyoxyalkylenepolyols having a molecular weight per hydroxyl group of at least 800 and/or a total unsaturation degree of at most 0.12 meq/g, other than the above mentioned polyoxyalkylenepolyol having a high molecular weight and a low unsaturated degree.

For the curing reaction, a curing acceleration catalyst may or may not be used. As the curing acceleration catalyst, it is possible to use a metal carboxylate such as an alkyl titanate, an organic silicon titanate, tin octylate or dibutyltin laurate, an amine salt such as a dibutylamine-2-ethylhexoate and other acidic catalysts or basic catalysts. Further, by incorporating a stabilizer or a degradation preventing agent, it may be possible to impart better whether resistance or heat resistance. The composition of the present invention may further contain a reinforcing agent, a filler, a plasticizer, a pigment, an anti-sagging agent, etc., as the case requires.

The reinforcing agent includes carbon black and fine silica powder, the filler includes calcium carbonate, talc, clay and silica, the plasticizer includes dioctyl phthalate, dibutyl phthalate, dioctyl adipate, paraffin chloride and a petroleum plasticizer, the pigment includes inorganic pigments such as iron oxide, chromium oxide and titanium oxide, and organic pigment such as phthalocyanine blue and phthalocyanine green, and the anti-sagging agent includes calcium carbonate treated with an organic acid, hydrogenated caster oil, aluminum stearate, calcium stearate, zinc stearate and fine silica powder.

Now, the present invention will be described in further detail with reference to Examples. However, it should be understood that the present invention is by no means restricted to such specific Examples.

The following oxyalkylenepolyols were synthesized by means of a hexacyanocobalt zinc complex catalyst.

Polyol A: polyoxypropylenetriol having a molecular weight of 10,000 and a total unsaturation degree of 0.033 meq/g Polyol B: polyoxypropylenetetraol having a molecular weight of 13,000 and a total unsaturation degree of 0.020 meq/g Polyol C: polyoxypropylenediol having a molecular weight of 10,000 and a total unsaturation degree of 0.038 meq/g Polyol D: polyoxypropylenediol having a molecular weight of 4,000 and a total unsaturation degree of 0.028 meq/g Polyol E: polyoxypropylenediol having a molecular weight of 10,000 and a total unsaturation degree of 0.038 meq/g

EXAMPLE 1

To 100 parts by weight of polyol A, 5.3 parts by weight of a mixture of 2,4- and 2,6-tolylene diisocyanates (blending ratio: 80/20) (trade name T-80, manufactured by Nippon Polyurethane Kogyo K.K.) was added, and the mixture was reacted in a reactor at 100° C. for 5 hours to obtain a polyurethane prepolymer having a free isocyanate content of 1.2% by weight.

On the other hand, as a curing agent, a mixture comprising 100 parts by weight of polyol C, 35 parts by weight of dioctyl phthalate, 203 parts by weight of calcium carbonate treated with a resin acid, 9 parts by weight of titanium oxide and 1.5 parts by weight of lead octylate (lead ocntent: 20%), was uniformly mixed by a kneader to obtain a uniform paste like dispersion. Then, 100 parts by weight of the main agent composed of the above prepolymer and 426 parts by weight of the curing agent were thoroughly mixed to obtain a uniform mixture, which was then molded into a sheet having a thickness of 2 mm and cured at 25° C. for 7 days. For the measurement of the physical properties, it was further aged at 50° C. for 7 days to obtain a completely cured product. The physical properties of this sheet were measured. The physical properties and the curing properties are shown in Table 1.

EXAMPLE 2

To 100 parts by weight of polyol A, 5.3 parts by weight of a mixture of 2,4- and 2,6-tolylene diisocyanates (mixing ratio: 80/20) (trade name T-80, manufactured by Nippon Polyurethane Kogyo K.K.) was added, and the mixture was reacted in a reactor at 100° C. for 5 hours to obtain a polyurethane prepolymer having a free isocyanate content of 1.2% by weight.

On the other hand, as a curing agent, a mixture comprising 100 parts by weight of polyol A, 42 parts by weight of dioctyl phthalate, 198 parts by weight of calcium carbonate treated by a resin acid, 11 parts by weight of titanium oxide and 2 parts by weight of lead octylate (lead content: 20%), was uniformly mixed by a kneader to obtain a uniform paste-like dispersion. Then, 100 parts by weight of the main agent composed of the prepolymer and 321 parts by weight of the curing agent were thoroughly mixed to obtain a uniform mixture, which was then molded into a sheet having a thickness of 2 mm and cured at 25° C. for 7 days. For the measurement of the physical properties, it was further aged at 50° C. for 7 days to obtain a completely cured product. The physical properties of this sheet were measured. The physical properties and the curing properties are shown in Table 1.

EXAMPLE 3

To 100 parts by weight of polyol B, 5.3 parts by weight of a mixture of 2,4- and 2,6-tolylene diisocyanates (mixing ratio: 80/20) (trade name T-80, manufactured by Nippon Polyurethane Kogyo K.K.) was added, and the mixture was reacted in a reactor at 100° C. for 5 hours to obtain a polyurethane prepolymer having a free isocyanate content of 1.2% by weight.

On the other hand, as a curing agent, a mixture comprising 100 parts by weight of polyol B, 42 parts by weight of dioctyl phthalate, 203 parts by weight of calcium carbonate treated by a resin acid, 10 parts by weight of titanium oxide and 2 parts by weight of lead octylate (lead content: 20%), were uniformly mixed by a kneader to obtain a uniform paste-like dispersion. Then, 100 parts by weight of the main agent composed of the prepolymer and 315 parts by weight of the curing agent were thoroughly mixed to obtain a uniform mixture, which was then molded into a sheet having a thickness of 2 mm and cured at 25° C. for 7 days. For the measurement of the physical properties, it was further aged at 50° C. for 7 days to obtain a completely cured product. The physical properties of this sheet were measured. The physical properties and the curing properties are shown in Table 1.

COMPARATIVE EXAMPLE 1

To a mixture comprising 25 parts by weight of a polyoxypropylenetriol having an average molecular weight of 3,000 and a total unsaturation degree of 0.04 meq/g and 75 parts by weight of a polyoxypropylenediol having an average molecular weight of 3,000 and a total unsaturation degree of 0.08 meq/g, 13.1 parts by weight of a mixture of 2,4- and 2,6-tolylene diisocyanate (mixing ratio: 80/20) (tradename T-80, manufactured by Nippon Polyurethane Kogyo K.K.) was added, and the mixture was reacted in a reactor at 100° C. for 5 hours to obtain a polyurethane prepolymer having a free isocyanate content of 2.8% by weight. On the other hand, as a curing agent, a mixture comprising 100 parts by weight of a polyoxypropylenediol having an average molecular weight of 3,000 and a total unsaturation degree of 0.08 meq/g, 41 parts by weight of dioctyl phthalate, 135 parts by weight of calcium carbonate treated by a resin acid, 11 parts by weight of titanium oxide and 2 parts by weight of lead octylate (lead content: 20% by weight), were uniformly mixed by a kneader to obtain a uniform paste-like dispersion. Then, 100 parts by weight of the main agent composed of the prepolymer and 349 parts by weight of the curing agent were thoroughly mixed to obtain a uniform mixture, which was then molded into a sheet having a thickness of 2 mm and cured at 25° C. for 7 days. Then, it was aged at 50° C. for 7 days. However, the cured product was soft and weak and not adequately hardened, and it was not practically durable.

EXAMPLE 4

To a mixture comprising 50 parts by weight of polyol A and 50 parts by weight of polyol C, 4.4 parts by weight of a mixture of 2,4- and 2,6-tolylene diisocyanates (mixing ratio: 80/20) (trade name T-80, manufactured by Nippon Polyurethane Kogyo K.K.) was added, and the mixture was reacted in a reactor at 100° C. for 5 hours to obtain a polyurethane prepolymer having a free isocyanate content of 1.0% by weight.

To 100 parts by weight of this prepolymer, 50 parts by weight of dioctyl phthalate, 50 parts of calcium carbonate treated with a resin acid and 10 parts by weight of titanium oxide were added, and the mixture was uniformly mixed by a kneader to obtain a homogeneous one-pack type curable polyurethane composition. This composition was moisture-cured in air for at least 7 days to obtain a completely cured sheet having a thickness of 2 mm. The physical properties of this sheet and the curing properties are shown in Table 1.

COMPARATIVE EXAMPLE 2

To a mixture comprising 50 parts by weight of a polyoxypropylenetriol having an average molecular weight of 3,000 and a total unsaturation degree of 0.04 meq/g and 50 parts by weight of a polyoxypropylenediol having an average molecular weight of 2,000 and a total unsaturation degree of 0.04 meq/g, 17.4 parts by weight of a mixture of 2,4- and 2,6-tolylene diisocyanates (mixing ratio: 80/20) (trade name T-80, manufactured by Nippon Polyurethane Kogyo K.K.) was added, and the mixture was reacted in a reactor at 100° C. for 5 hours to obtain a polyurethane prepolymer having a free isocyanate content of 3.6% by weight.

To 100 parts by weight of this prepolymer, 50 parts by weight of dioctyl phthalate, 50 parts of calcium carbonate treated with a resin acid and 10 parts by weight of titanium oxide were added and uniformly mixed by a kneader to obtain a homogeneous one-pack type curable polyurethane composition.

The composition was moisture-cured to obtain a completely cured sheet having a thickness of 2 mm. The physical properties of this sheet and the curing properties are shown in Table 1.

EXAMPLE 5

To a mixture comprising 100 parts by weight of polyol A and 50 parts by weight of polyol D, 9.6 parts by weight of a mixture of 2,4- and 2,6-tolylene diisocyanates (mixing ratio: 80/20) (trade name T-80, manufactured by Nippon Polyurethane Kogyo K.K.) was added, and the mixture was reacted in a reactor at 100° C. for 5 hours to obtain a polyurethane prepolymer having a free isocyanate content of 1.5% by weight, which was used as the main agent.

On the other hand, as a curing agent, a mixture comprising 40 parts of a polyoxypropylenediol having an average molecular weight of 2,000 and a total unsaturation degree of 0.02 meq/g, 35 parts of a polyoxypropylenetriol having an average molecular weight of 4,000 and a total unsaturation degree of 0.02 meq/g, 2 parts of 4,4'-methylenebis(2-chloroaniline), 60 parts of carbon, 35 parts of calcium carbonate, 24 parts of dioctyl phthalate and 4 parts of lead octylate, was uniformly mixed by a kneader to obtain a homogeneous paste-like dispersion.

Then, 100 parts by weight of the above main agent and 81 parts by weight of the curing agent were thoroughly mixed to obtain a uniform mixture, which was molded into a sheet having a thickness of 2 mm. The sheet was aged at 25° C. for 7 days and then at 50° C. for 7 days to obtain a completely cured product. The physical properties of this sheet and the curing properties are shown in Table 1.

EXAMPLE 6

To 100 parts by weight of polyol E, 10.5 parts by weight of a mixture of 2,4- and 2,6-tolylene diisocyanates (mixing ratio: 80/20) (trade name T-80, manufactured by Nippon Polyurethane Kogyo K.K.) was added, and the mixture was reacted in a reactor at 100° C. for 5 hours to obtain a polyurethane prepolymer having a free isocyanate content of 2.3% by weight.

On the other hand, as a curing agent, a mixture comprising 100 parts by weight of polyol C, 28 parts by weight of dioctyl phthalate, 131 parts by weight of calcium carbonate treated with a resin acid, 7 parts by weight of titanium oxide and 0.8 part by weight of lead octylate (lead content: 20%), was uniformly mixed by a kneader to obtain a homogeneous paste-like dispersion. Then, 100 parts by weight of the main agent composed of the polyurethane prepolymer and 695 parts by weight of the curing agent were thoroughly mixed to obtain a uniform mixture which was then molded into a sheet having a thickness of 2 mm and cured at 25° C. for 7 days. For the measurement of the physical properties, it was further aged at 50° C. for 7 days to obtain a completely cured product. The physical properties of this sheet were measured. The physical properties and the curing properties are shown in Table 1.

TABLE 1

|  | Tensile physical properties | | | Curing properties (25° C.) | Surface |
| --- | --- | --- | --- | --- | --- |
|  | $M_{50}$ (kg/cm$^2$) | Ts (kg/cm$^2$) | E (%) | Tack free time (hr) | tackiness 1) |
| Example 1 | 0.5 | 4.1 | 1,400 | 8.0 | Δ |
| Example 2 | 2.4 | 15.1 | 940 | 3.0 | ◯ |
| Example 3 | 2.2 | 13.7 | 870 | 1.8 | ◯ |
| Example 4 | 2.8 | 12.6 | 480 | — | ◯ |
| Example 5 | 1.8 | 17.6 | 820 | 5.0 | ◯ |
| Example 6 | 1.6 | 9.7 | 1,100 | 6.0 | |
| Comparative Example 1 | <0.1 | weak | >1,500 | 20.0 | x |
| Comparative Example 2 | 8.4 | 15.3 | 120 | — | ◯ |

1) The surface tackiness was evaluated by four ratings of ⊚, ◯, Δ and x by a feeling test with a finger.

We claim:

1. A room temperature curable polyurethane composition comprising as a curable component a polyurethane prepolymer having terminal isocyanate groups obtained by reacting an organic polyisocyanate and a polyol comprising as the main component a polyoxyalkylenepolyol having a molecular weight per hydroxyl group of from 1,500 to 15,000 and a total unsaturation degree of at most 0.07 meq/g.

2. The composition according to claim 1, wherein the polyoxyalkylenepolyol has a molecular weight per hydroxyl group of from 2,000 to 15,000 and a total unsaturation degree of at most 0.04 meq/g.

3. The composition according to claim 1, wherein the polyoxyalkylenepolyol has from 3 to 8 hydroxyl groups.

4. The composition according to claim 1, wherein the polyoxyalkylenepolyol is a polyoxypropylenepolyol having an oxypropylene group content of at least 70% by weight.

5. A moisture-curable sealing or waterproof material comprising a room temperature curable polyurethane composition as defined in claim 1.

6. A room temperature curable polyurethane composition comprising as a curable component a combination of a polyurethane prepolymer having terminal isocyanate groups obtained by reacting an organic polyisocyanate and a polyol comprising as the main component a polyoxyalkylenepolyol having a molecular weight per hydroxyl group of from 1,500 to 15,000 and a total unsaturation degree of at most 0.07 meq/g, and a second polyoxyalkylenepolyol.

7. The composition according to claim 6, wherein the polyoxyalkylenepolyol has a molecular weight per hydroxyl group of from 2,000 to 15,000 and a total unsaturation degree of at most 0.04 meq/g.

8. The composition according to claim 6, wherein the polyoxyalkylenepolyol has from 3 to 8 hydroxyl groups.

9. The composition according to claim 6, wherein the polyoxyalkylenepolyol is a polyoxypropylenepolyol having an oxypropylene group content of at least 70% by weight.

10. The composition according to claim 6, wherein the second polyoxyalkylenepolyol is a polyoxyalkylenepolyol having a molecular weight per hydroxyl group of from 1,500 to 15,000 and a total unsaturation degree of at most 0.07 meq/g.

* * * * *